United States Patent
Rosenbecker et al.

(10) Patent No.: US 8,528,678 B2
(45) Date of Patent: Sep. 10, 2013

(54) INTEGRALLY MOLDED PLASTIC PART COMPRISING A DOOR SNAPPING INTO A CLOSED POSITION WITHOUT PLAY

(71) Applicant: WEGU Holding GmbH, Kassel (DE)

(72) Inventors: Martin Rosenbecker, Schwuelper (DE); Victoria Borchers, Kaufungen (DE)

(73) Assignee: Wegu Holding GmbH, Kassel (DE)

( * ) Notice: Subject to any disclaimer, the term of this patent is extended or adjusted under 35 U.S.C. 154(b) by 0 days.

(21) Appl. No.: 13/739,215

(22) Filed: Jan. 11, 2013

(65) Prior Publication Data
US 2013/0174491 A1  Jul. 11, 2013

(30) Foreign Application Priority Data
Jan. 11, 2012 (DE) .................. 10 2012 100 198

(51) Int. Cl.
*B60K 11/00* (2006.01)
(52) U.S. Cl.
USPC ........................................ 180/68.1; 454/162
(58) Field of Classification Search
USPC .............. 180/68.1; 137/511, 513.5; 454/70, 454/71, 162, 164–165
See application file for complete search history.

(56) References Cited

U.S. PATENT DOCUMENTS

| | | | |
|---|---|---|---|
| 6,075,382 A * | 6/2000 | Tournier | 326/83 |
| 6,132,308 A | 10/2000 | Dietz et al. | |
| 6,210,266 B1 * | 4/2001 | Barton | 454/162 |
| 6,357,473 B1 * | 3/2002 | Porter et al. | 137/512.15 |
| 6,544,115 B1 * | 4/2003 | Graf | 454/143 |
| 6,648,749 B2 * | 11/2003 | Hayashi et al. | 454/162 |
| 6,837,265 B2 * | 1/2005 | Porter et al. | 137/512.15 |
| 6,969,314 B2 * | 11/2005 | Misner | 454/164 |
| 7,044,164 B2 * | 5/2006 | Carlson | 137/854 |
| 7,077,742 B2 * | 7/2006 | Stevenson et al. | 454/259 |
| 7,182,093 B2 * | 2/2007 | Call et al. | 137/15.18 |
| 7,302,962 B2 * | 12/2007 | Blake et al. | 137/15.18 |
| 7,503,843 B1 * | 3/2009 | Wilmoth | 454/162 |
| D626,644 S * | 11/2010 | Jacak et al. | D23/393 |
| 8,328,609 B2 * | 12/2012 | Schneider | 454/162 |

FOREIGN PATENT DOCUMENTS

| | | |
|---|---|---|
| DE | 196 29 115 C2 | 1/1998 |
| DE | 298 18 495 U1 | 12/1998 |

* cited by examiner

*Primary Examiner* — John Walters
*Assistant Examiner* — James Triggs
(74) *Attorney, Agent, or Firm* — Thomas | Horstemeyer, LLP

(57) ABSTRACT

An integrally molded plastic part has a main body with an opening, and a door connected to the main body via an integral hinge and snapping into a closed position closing the opening. The door, at each of its two sides extending away from the hinge, includes a stopping surface via which the door, in its closed position, abuts against a supporting surface of the main body, and a snap-in hook protruding from the stopping surface and comprising a retaining surface which engages behind an edge of a flange confining the supporting surface. A distance between the two retaining surfaces as compared to a distance between the flanges confining the two supporting surfaces decreases with increasing distance to the hinge, whereas distances between the retaining and stopping surfaces as compared to distances between the edges of the flanges and the supporting surfaces increase with increasing distance to the hinge.

10 Claims, 2 Drawing Sheets

INTEGRALLY MOLDED PLASTIC PART COMPRISING A DOOR SNAPPING INTO A CLOSED POSITION WITHOUT PLAY

CROSS REFERENCE TO RELATED APPLICATIONS

This application claims priority to German Patent Application No. DE 10 2012 100 198.7 entitled "Einstuckiges Kunststoffformteil mit einer spielfrei in eine Schließstellung einschnappenden Klappe", filed on Jan. 11, 2012.

FIELD

The present invention relates to an integrally molded plastic part comprising a door snapping into a closed position.

The plastic part may particularly be a component of a motor vehicle. Even more particularly, it may be a component located in the motor compartment of a motor vehicle, like for example a component guiding air to an air heat exchanger.

The door of the plastic part serves for providing access to a further component located behind the plastic part, for example. For this purpose, the door can be opened out of its closed position. After accessing the further part, the door can again be brought into its closed position.

PRIOR ART

In known molded plastic parts comprising a door snapping into a closed position, the door, on both sides of a door hinge, in closing direction about the door hinge, abuts against a supporting surface via a stopping surface of the door. Simultaneously, the door, in lateral direction, i.e. parallelly to the door hinge, engages behind edges of flanges confining the supporting surfaces and extending away from the door hinge via snap-in hooks protruding from its stopping surfaces and also extending away from the door hinge. These snap-in hooks comprise deviating surfaces at their front ends via which they are laterally pressed in due to contact with the flanges confining the supporting surfaces, until they snap in behind the edges of these flanges. These deviating surfaces also guide the door into its place between the flanges confining the two supporting surfaces on both sides of an opening in the molded plastic part, which is closed by the door in the closed position of the door.

The deviating surfaces of the snap-in hooks of the door of the known plastic part have to be comparatively broad to fulfill their desired function, and, as a consequence, the snap-in hooks have to be comparatively high to securely guide the door into its closed position even with tolerances occurring, which are often unavoidable with large molded plastic parts. Further, it proves to be difficult to hold the door without play in its closed position, on the one hand, and to nevertheless be able to open the door out of its closed position without damaging its snap-in hooks so that the door may snap into its closed position again, on the other hand.

There still is a need for an integrally molded, i.e. one-piece plastic part comprising a door snapping into a closed position, in which the door, even with higher tolerances occurring, is securely guided into its closed position and held in its closed position without play and in which opening of the door out of its closed position is nevertheless possible without damaging its snap-in hooks.

SUMMARY OF THE INVENTION

The present invention relates to an integrally molded plastic part comprising a main body with an opening, and a door connected to the main body at one side of the opening via an integral hinge and configured to snap into a closed position closing the opening of the main body. The door, at each of its two sides extending away from the hinge, comprises a stopping surface via which the door, in its closed position, abuts against a supporting surface of the main body located at the circumference of the opening, and a snap-in hook protruding from the respective stopping surface and comprising a retaining surface which extends away from the hinge, and which, with its rim, engages behind an edge of a flange confining the respective supporting surface. A distance between the rims of the two retaining surfaces at the two sides of the door measured in a direction parallel to the hinge as compared to a distance between the flanges confining the two supporting surfaces measured in a direction parallel to the hinge decreases with increasing distance to the hinge, whereas distances between the retaining surfaces and the stopping surfaces as compared to distances between the edges of the flanges and the supporting surfaces increase with increasing distance to the hinge.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

In the following, the present invention will be further explained and described with reference to the attached drawings.

DETAILED DESCRIPTION

Figure 1:
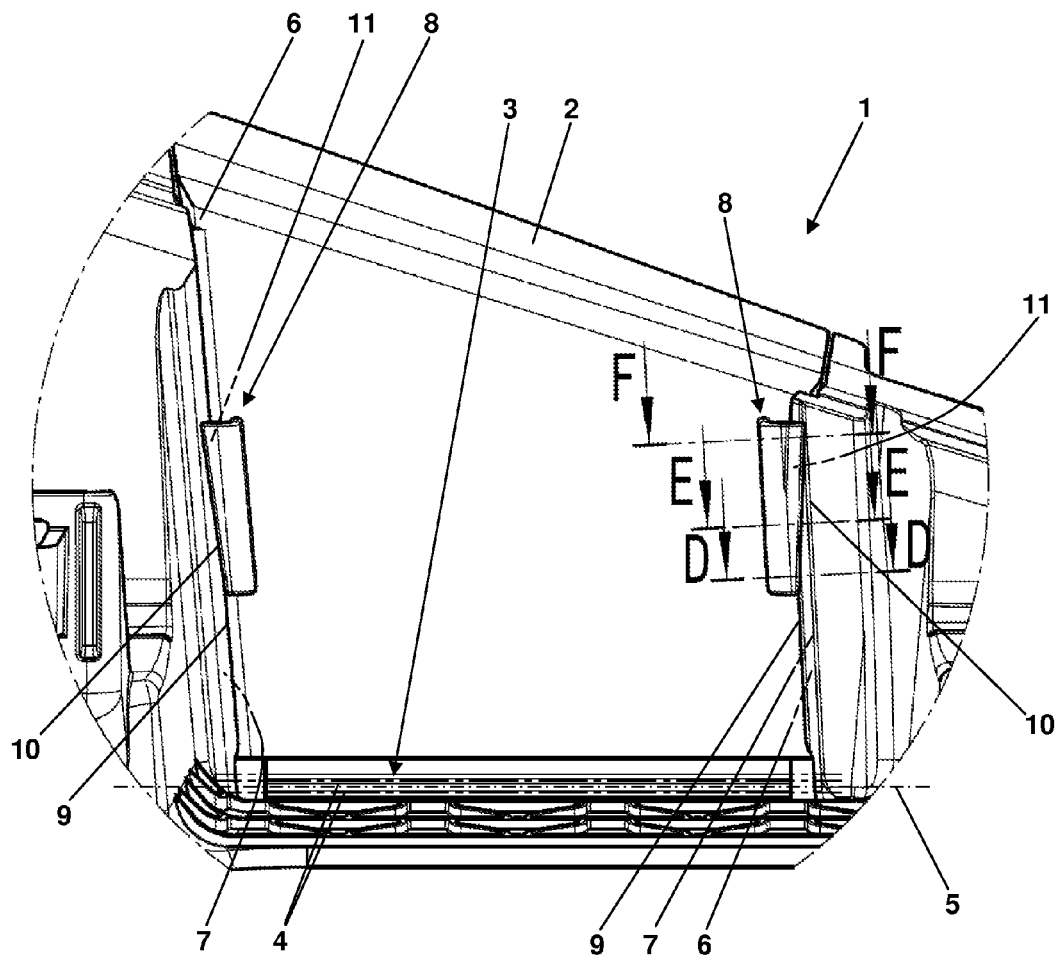
FIG. 1 is a back view of an integrally molded plastic part comprising a door.

In an integrally molded plastic part according to the present invention comprising a door snapping into a closed position, wherein the door at both sides or ends of a door hinge, in its closed position about the door hinge, abuts against supporting surfaces via stopping surfaces of the door, and, parallelly to the door hinge engages behind edges of flanges confining the supporting surfaces and extending away from the door hinge via retaining surfaces also extending away from the door hinge and provided at snap-in hooks protruding from the stopping surfaces, a distance of rims of the retaining surfaces in a direction parallel to the door hinge, as compared to a distance of the flanges confining the supporting surfaces also in a direction parallel to the door hinge, decreases with increasing distance to the door hinge, whereas distances of the retaining surfaces to the stopping surfaces, as compared to distances of the edges of the flanges confining the supporting surfaces to the supporting surfaces themselves, increase with increasing distance to the door hinge.

The course of the rims of the retaining surfaces according to the present invention, by which the snap-in hooks terminate behind the flanges confining the supporting surfaces in the closed position of the door, has the result that, during closing the door, during which the areas of the snap-in hooks located closer to the door hinge engage between the flanges confining the supporting surfaces at first, this engagement is made particularly easy by the comparatively low distance of the rims of the retaining surfaces in this area close to the door hinge. Further, the door is automatically centered between the flanges confining the supporting surfaces. In further closing the door, the snap-in hooks further enter between the flanges confining the supporting surfaces, wherein they are laterally compressed via the rims of the retaining surfaces sliding along the flanges. No special deviating surfaces at the snap-in hooks are required for this purpose. When the door reaches its closed position, the rims of the retaining surfaces of the snap-in hooks snap behind the edges of the flanges confining the supporting surfaces due to the course or shape of the retaining surfaces and of the edges of the flanges. In the closed position of the door, the retaining surfaces tightly and preferably with some elastic force abut against the flanges confining the supporting surfaces in those areas close to the door hinge. Although the rims of the retaining surfaces only slightly engage behind the edges of the flanges here, there is no danger that the door unintentionally opens out of its closed position, because the rims of the retaining surfaces engage behind the edges of the flanges to a larger extent in the areas of the snap-in hooks farther away from the door hinge. Due to the lower distance of the retaining surfaces from the stopping surfaces in the areas of the snap-in hooks closer to the door hinge, the stiffness of the snap-in hooks is higher in these areas than in their areas farther away from the door hinge. As a result, the door is held with a sufficiently high holding force in its closed position. Nevertheless, the door can be opened without damaging its snap-in hooks by overcoming this holding force, and the door may subsequently be closed into its closed position again. Even if the door of the molded plastic part according to the present invention may not be suited for being opened and closed again very often, it allows for being opened and closed some times without damaging its snap-in hooks.

The design of the snap-in hooks of the door of the molded plastic part of the present invention appears to be unusual as their retaining surfaces are not abutting against the flanges confining the supporting surfaces where the rims of the retaining surfaces engage behind the edges of the flanges to the farthest extent, whereas there, where such an abutment is present, the retaining surfaces only engage behind the edges of the flanges to a small extent. Nevertheless, the retaining surfaces of the snap-in hooks of the door of the molded plastic part according to the present invention have a function over their entire extension away from the door hinge. Further, the design of the snap-in hooks may appear unusual but it enables an easy manufacture of the molded plastic part according to the present invention. Particularly, the snap-in hooks do not need any additional deviation or guiding surfaces at their front ends.

As defined above, it is not essential that the absolute distance of the rims of the retaining surfaces in a direction parallel to the hinge decreases with increasing distance to the hinge. It is only essential that this distance decreases as compared to the distance of the flanges confining the supporting surfaces in a direction parallel to the hinge with increasing distance to the hinge. Similarly, it is not essential that the absolute distances of the retaining surfaces to the stopping surfaces increase with increasing distance to the door hinge. Instead, it is essential that these distances increase as compared to the distances of the flanges confining the supporting surfaces to the surfaces themselves. I.e. the course of the retaining surfaces and their rims has to be adjusted to the course of the flanges confining the supporting surfaces. As long as the flanges confining the supporting surfaces, however, run in parallel to each other, the rims of the retaining surfaces display a V-shaped opening in a direction away from the door hinge.

The snap-in hooks of the molded plastic part according to the present invention may have a cross-section of a simple inverted L-shape, as they do not need to have any deviation surfaces at their front ends, as already explained. The width of the free limbs of the L-shaped snap-in hooks may increase with increasing distance to the door hinge. Then, the other limbs of the L-shaped snap-in hooks attached to the stopping surfaces may increase in length with increasing distance to the door hinge, but these limbs may keep a constant distance to the flanges confining the supporting surfaces.

The snap-in hooks may have a constant wall thickness. In this case, the rims of their retaining surfaces will nevertheless have a higher form stiffness close to the door hinge than farther away from the door hinge due to the dimensions of the snap-in hooks increasing with increasing distance to the door hinge.

The door hinge of the door of the molded plastic part of the present invention may have several target bending lines, i.e. it needs not to be an integral hinge with a single target bending line. All target bending lines are typically parallel. However, the target bending lines may also be arranged at small angles. A softness of a guidance of the door over its closing movement about the door hinge due to the plurality of target bending lines is compensated for by the aligning and guiding function of its snap-in hooks sliding along the flanges confining the supporting surfaces.

It is particularly easy to get the snap-in hooks of the door of the molded plastic part according to the present invention between the flanges confining the supporting surfaces, if these flanges are oriented at an inclination angle to the direction in which the door is closed. They thus provide a funnel for the rims of the retaining surfaces of the snap-in hooks. This also implicates that the flanges confining the supporting surfaces are no simple rims of the supporting surfaces but run at an angle to the supporting surfaces.

As already mentioned, the door of the molded plastic part according to the present invention may be reopened out of its closed position without damage, particularly without damaging its snap-in hooks.

In a particular embodiment of the molded plastic part according to the present invention the door and the areas of the molded plastic part neighboring the door in its closed position are designed as air guiding surfaces. This embodiment of the molded plastic part may be configured to be mounted in an engine compartment of a motor vehicle. Particularly, an exchangeable object or an object which is only mounted after the molded plastic part may then be arranged behind the door. This part is accessible through the opened door. The door may also cover other parts to which access is only necessary from time to time.

Now referring in greater detail to the drawings, an integrally molded plastic part 1 which is partially shown in FIG. 1 includes a door 2 which is permanently connected to the remainder of the molded plastic part 1 via a door hinge 3. In the area of the hinge 3 several target bending lines 4 are defined in the molded plastic part 1, which together define a hinge axis 5 of the door hinge 3. In FIG. 1, the door 2 is shown in a closed position into which it can be snapped in with regard to the remainder of the molded plastic part 1, and in which it closes an opening in the remainder of the molding plastic part 1. When manufacturing the plastic part 1 by injection molding, for example, the door 2 will be in an open position. This may have the result that the door 2 is biased by a bias force provided by the door hinge 3 out of its closed position according to FIG. 1 into its original open position. This bias force, however, will only be small and will have little effect on the function of the molded plastic part 1 according to the present invention. In its closed position, the door 2 abuts against supporting surfaces 7 of the neighboring areas of the remainder of the plastic part 1 via stopping surfaces 6. Further, snap-in hooks 8 protruding from the stopping surfaces 6 engage behind flanges 9 confining the supporting surfaces 7. The snap-in hooks 8 show a variation of their engagement behind the flanges 9 with increasing distance to the door hinge 3. This variation of the engagement is illustrated in FIGS. 2 to 4.

Figure 2:
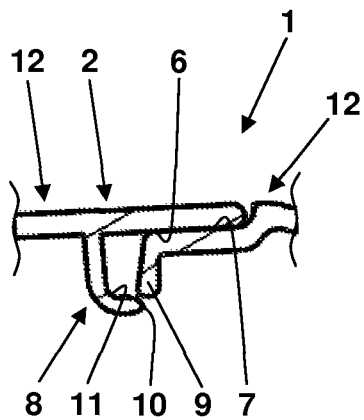
FIG. 2 is a cross-section through the integrally molded plastic part along a line D-D depicted in FIG. 1 with a viewing direction indicated in FIG. 1 by arrows.
Figure 3:
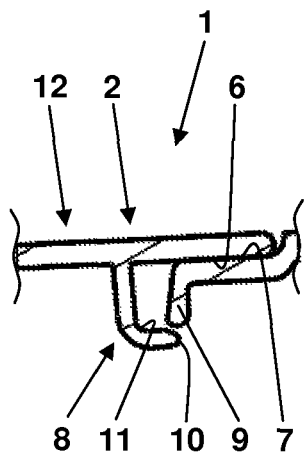
FIG. 3 is a cross-section through the integrally molded plastic part along a line E-E depicted in FIG. 1 with a viewing direction indicated in FIG. 1 by arrows.
Figure 4:
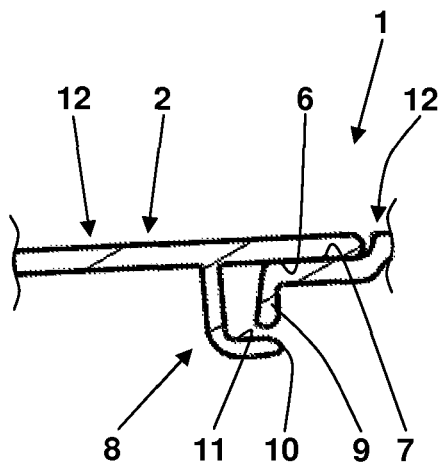
FIG. 4 is a cross-section through the integrally molded plastic part along a line F-F depicted in FIG. 1 with a viewing direction also indicated in FIG. 1 by arrows.

The cross-sections along lines D-D, E-E and F-F indicated in FIG. 1, which are shown in FIGS. 2 to 4 represent to an increasing distance of the depicted snap-in hook 8 from the hinge axis 5 of the door hinge 3 according to FIG. 1. Close to the door hinge 3, a rim 10 of a retaining surface 11 of the snap-in hook 8 only slightly engages behind the edge of the flange 6 confining the neighboring supporting surface 7. On the other hand, a distance of the retaining surface 11 to the stopping surface 6 is comparatively small. Correspondingly, the snap-in hook 8 directly abuts against the flange 9 with its retaining surface 11 in the cross-section of FIG. 2. In medium distance of the snap-in hook 8 to the door hinge 3 according to FIG. 3, the engagement of the rim 10 of the retaining surface 11 behind the flange 9 is farther than in FIG. 2. At the same time, however, the distance of the retaining surface 11 to the stopping surface 6 is also higher so that there is already a distance between the edge of the flange 9 and the retaining surface 11. This tendency has proceeded further in FIG. 4. I.e. the engagement of the rim 10 of the retaining surface 11 behind the flange 9 is even farther. Further, the distance between the edge of the flange 9 and the retaining surface 11 also increased.

During closing of the door 2 about the hinge axis 5 of the door hinge 3 according to FIG. 1, the snap-in hooks 8 at first hit onto the flanges 9 with their areas located most closely to the hinge axis 5, as they correspond to FIG. 2. Due to the inclination of the flanges 9 oriented at an angle to the supporting surfaces 7, the door 2 with its snap-in hooks 8 is guided between the flanges 9 and the snap-in hooks 8, as a result, are aligned with regard to the flanges 9. During further closing the door 2 until its stopping surfaces 6 abut against the supporting surfaces 7, the snap-in hooks 8 also enter between and finally behind the flanges 9 with their areas farther away from the door hinge 3 according to FIG. 1, which correspond to FIGS. 3 and 4. During this movement, the snap-in hooks 8 are at first increasingly elastically bent inwards until they snap behind the flanges 9. In the final closed position of the door 2, the door 2 is held by the areas of the snap-in hooks 8 close to the hinge axis 5 as depicted in FIG. 2, wherein the rims 10 abut against the edges of the flanges 9 with an elastic force. The areas of the snap-in hooks farther away from the door hinge 2 as depicted in FIGS. 3 and 4, which display an engagement of the retaining surfaces 11 farther behind the flanges 9, hold the door in its closed position, even if higher forces are exerted to the door in opening direction.

Nevertheless, the door may be opened out of its closed position according to FIG. 1 without damage by applying a higher force onto the door which is sufficient to deform the snap-in hooks 8 again. The door may, for example, be reopened to provide access to an object located behind the door 2 in its closed position. Afterwards, the door 2 may be closed again, wherein the snap-in hooks 8 again engage behind the flanges 9 confining the supporting surfaces 7.

In a particular embodiment example, the door 2 together with neighboring areas of the molded plastic part 1 provide air guiding surfaces 12 which, for example, guide air in the motor compartment of a motor vehicle towards an air heat exchanger.

Many variations and modifications may be made to the preferred embodiments of the invention without departing substantially from the spirit and principles of the invention. All such modifications and variations are intended to be included herein within the scope of the present invention, as defined by the following claims.

We claim:

1. An integrally molded plastic part, comprising:
   a main body with an opening, and
   a door connected to the main body at one side of the opening via an integral hinge and configured to snap into a closed position closing the opening of the main body,
   wherein the door at each of its two sides extending away from the hinge comprises
      a stopping surface via which the door, in its closed position, abuts against a supporting surface of the main body located at the circumference of the opening, and
      a snap-in hook protruding from the respective stopping surface and comprising a retaining surface which extends away from the hinge, and which, with its rim, engages behind an edge of a flange confining the respective supporting surface, and
   wherein a distance between the rims of the two retaining surfaces at the two sides of the door measured in a direction parallel to the hinge as compared to a distance between the flanges confining the two supporting surfaces measured in a direction parallel to the hinge decreases with increasing distance to the hinge, whereas distances between the retaining surfaces and the stopping surfaces as compared to distances between the edges of the flanges and the supporting surfaces increase with increasing distance to the hinge.

2. The integrally molded plastic part of claim 1, wherein the edges of the flanges confining the two supporting surfaces are parallel, and wherein the rims of the two retaining surfaces are straight but enclose an angle opening away from the hinge.

3. The plastic part of claim 1, wherein the snap-in hooks are L-shaped in cross section.

4. The plastic part of claim 1, wherein the snap-in hooks have a constant wall thickness.

5. The plastic part of claim 1, wherein the hinge defines a plurality of bending lines about which the door can be swiveled relative to the main body.

6. The plastic part of claim 5, wherein all bending lines are parallel.

7. The plastic part of claim 1, wherein the flanges confining the supporting surfaces are oriented at an inclination angle to a direction in which the door is closed about the hinge.

8. The plastic part of claim 1, wherein the door is configured to be re-openable out of its closed position.

9. The plastic part of claim 1, wherein the door and areas of the main part which are laterally adjacent to the door in the closed position of the door are configured to guide air in an engine compartment of a motor vehicle.

10. The plastic part of claim 1, wherein the door is configured to provide access to an object arranged in an engine compartment of a motor vehicle and covered by the door in the closed position of the door.

* * * * *